United States Patent [19]

Bradley et al.

[11] 4,408,557
[45] Oct. 11, 1983

[54] TIMER AND STORAGE CONDITION INDICATOR

[75] Inventors: Robert F. Bradley; Lindell P. Bradley, both of New Buffalo, Mich.

[73] Assignee: Micro-Circuits Co., Inc., New Buffalo, Mich.

[21] Appl. No.: 255,119

[22] Filed: Apr. 17, 1981

Related U.S. Application Data

[62] Division of Ser. No. 49,082, Jun. 18, 1979, Pat. No. 4,292,916.

[51] Int. Cl.³ .................. G01N 31/32; G04F 1/00
[52] U.S. Cl. ............................ 116/206; 116/308; 368/327
[58] Field of Search .............. 116/308, 219, 207; 368/114, 120, 92

[56] References Cited

U.S. PATENT DOCUMENTS

| | | | |
|---|---|---|---|
| 3,055,759 | 9/1962 | Busby et al. | 116/207 X |
| 3,414,415 | 12/1968 | Broad, Jr. | 116/219 |
| 3,520,124 | 7/1970 | Myers | 116/200 X |
| 3,677,088 | 7/1972 | Lang | 73/356 |
| 3,954,011 | 5/1976 | Manske | 368/327 X |
| 3,962,920 | 6/1976 | Manske | 368/327 |
| 3,967,579 | 7/1976 | Seiter | 116/219 |
| 4,229,813 | 10/1980 | Lilly et al. | 368/89 |

Primary Examiner—Daniel M. Yasich
Attorney, Agent, or Firm—Marmaduke A. Hobbs; Raymond W. Campbell

[57] ABSTRACT

A timer and storage conditions indicator for indicating the passage of a predetermined length of time under predetermined ambient physical environmental conditions, in which a carrier mixture is contained in a relatively confined area above a base layer. An absorptive layer is disposed on the base layer and accepts the carrier mixture at a predetermined rate. A barrier means is disposed between the carrier mixture and the absorptive layer, and the removal of the barrier activates the timer. Transfer means such as a capillary tube or a second absorptive layer may be disposed between the carrier mixture and the first mentioned absorptive layer.

15 Claims, 10 Drawing Figures

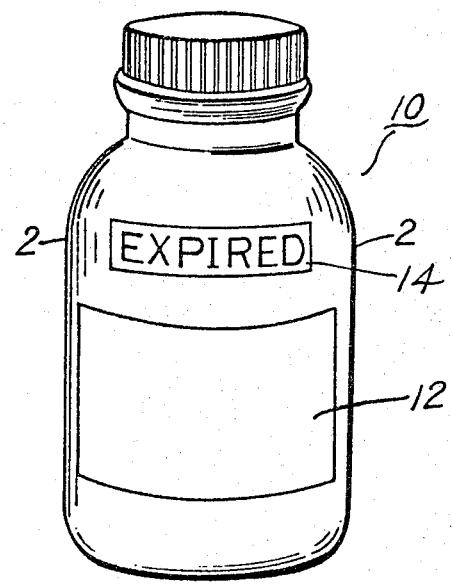
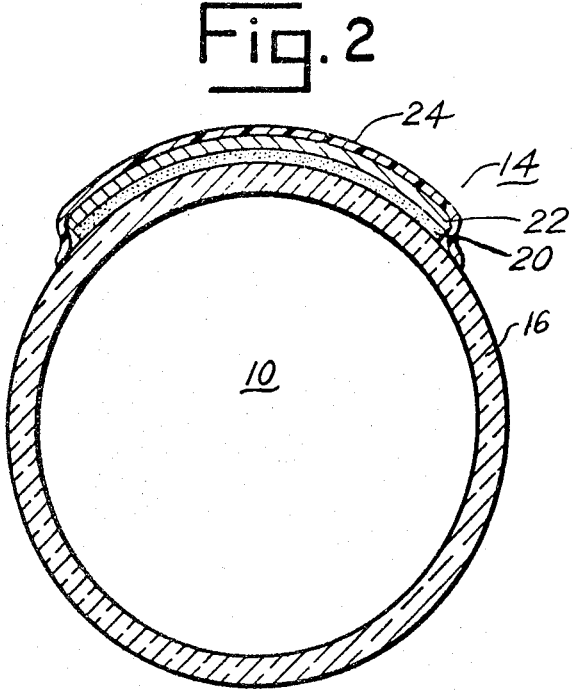
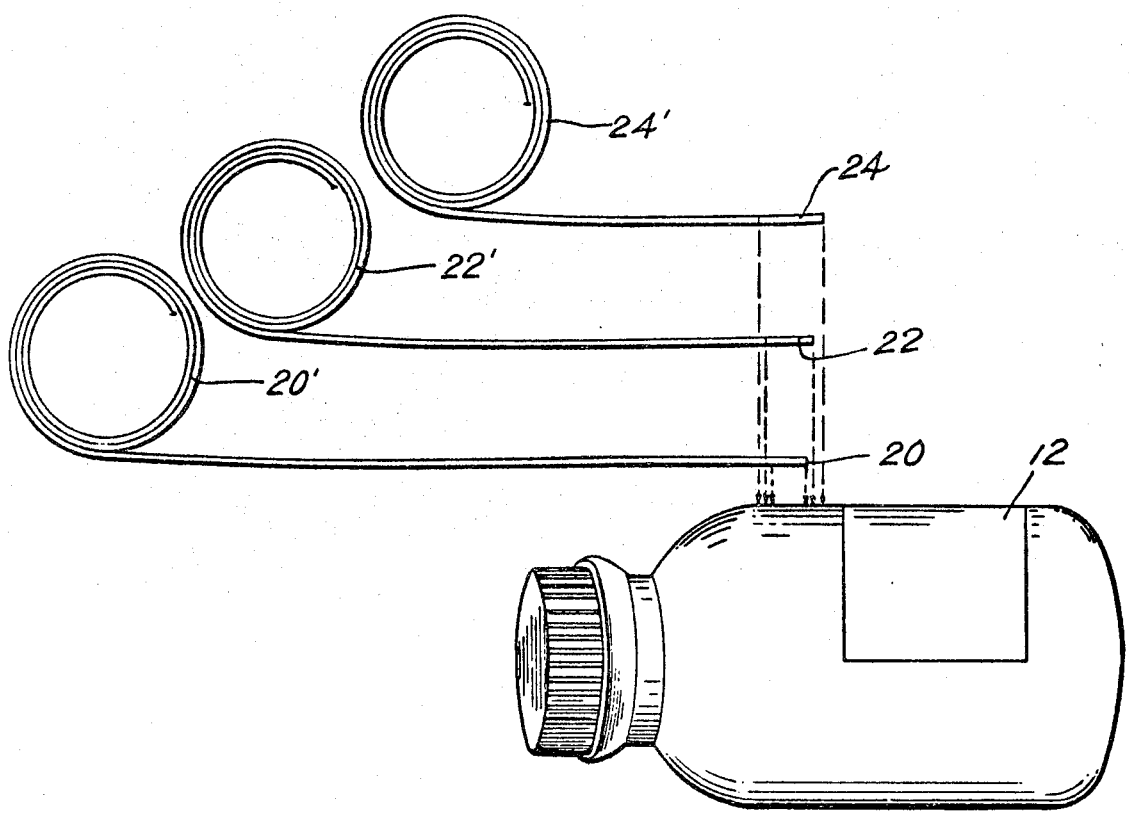

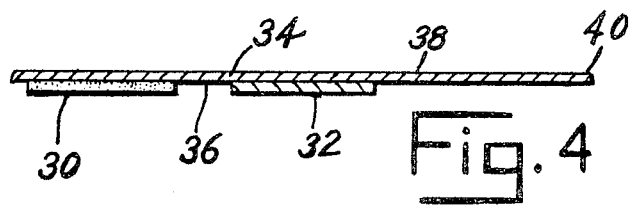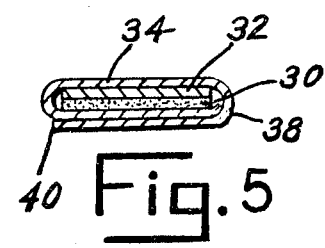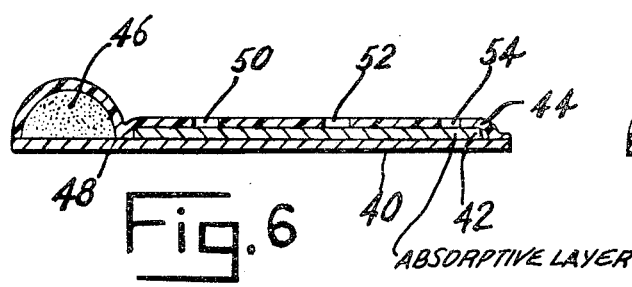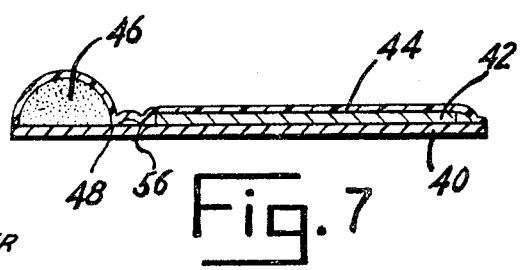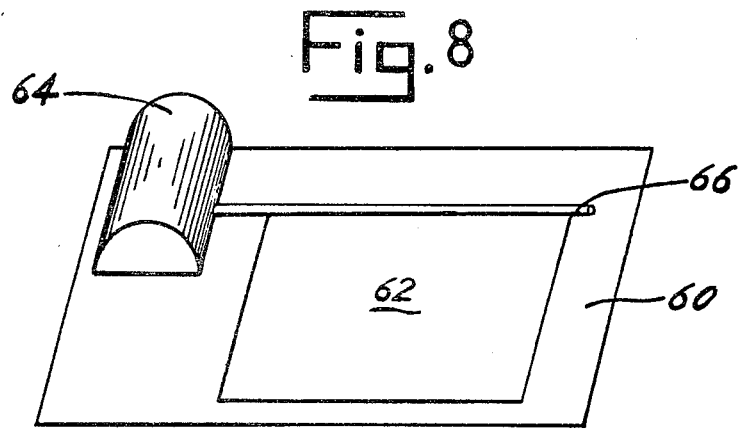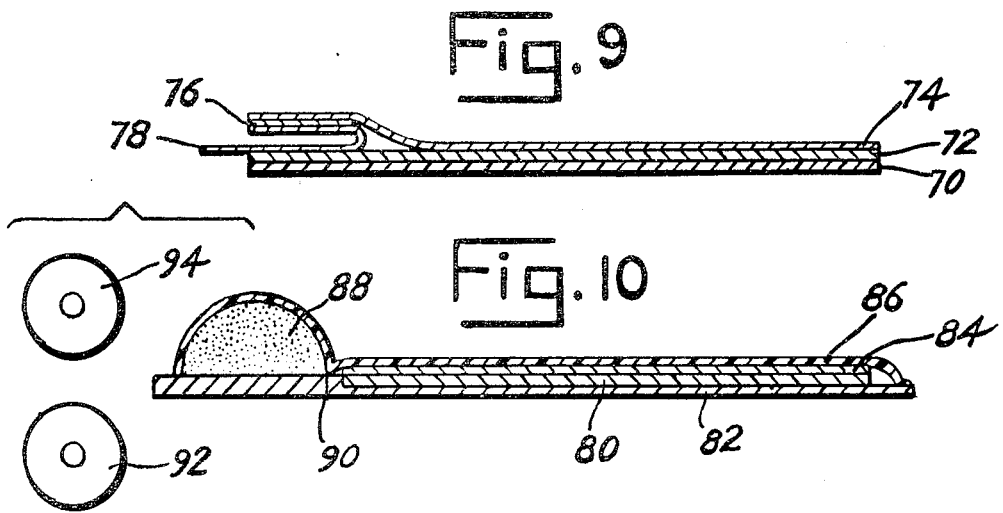

TIMER AND STORAGE CONDITION INDICATOR

CROSS-REFERENCE TO RELATED APPLICATIONS

This application is a division of application Ser. No. 49,082 filed June 18, 1979, now U.S. Pat. No. 4,292,916.

BACKGROUND OF THE INVENTION

Many industries, such as pharmaceutical companies, dairy companies, orange juice companies, photo film suppliers and the like, have a continuing problem of the sale of outdated products. The previous method of protecting against this problem primarily consisted of printing an expiration date on the package. One disadvantage of this method has been that the printed date is easily overlooked or ignored. A person in haste may not look closely at the date on the package, or may simply forget to check each time the supply is used, as for example, when a druggist dispenses drugs from a large supply bottle to fill a small prescription for a customer. Likewise, one who does not wish to incur the additional expense involved in discarding outdated products may pass them on to an unknowing customer who cannot see the date on the supply. A further and perhaps a more critical disadvantage of the previous method is that calculation of the expiration date is made assuming that storage will be done under proper conditions. In the case of a drug which becomes impotent or perhaps even dangerous if not stored at the proper temperature, the calculation of the expiration date will assume that the storage is done at the proper temperatures. If the temperatures are not kept at proper levels, the printed expiration date is of no value in ascertaining if the drug is wholesome. Similarly, the expiration date on perishable foods assumes that storage will be proper. A product with a shelf life of many days or weeks if stored at proper temperatures may spoil in several hours if stored improperly. The present method of guarding against the sale of spoiled products by printing a pre-determined expiration date on the package is totally ineffective in these cases. It is therefore one of the principal objects of the present invention to provide a timer and storage condition indicator which can indicate expiration of shelf like, taking into consideration storage conditions such as time, temperature, humidity, light, radiation or other physical factors, and which will calculate expiration based upon those factors.

Another object of the present invention is to provide a timer and storage condition indicator which indicates expiration of time in a prominent manner such that it cannot accidentally be overlooked easily, and which is so prominent as to arouse the suspicions of persons observing it, thereby discouraging intentional disregard of the expiration date.

Yet another object of the present invention is to provide a timer and storage condition indicator which can easily be assembled, either mechanically or manually, and which can easily and simply be modified to accommodate varying physical conditions and timing lengths, thereby making it practical for both small scale packaging operations, such as local drug stores or pharmacies, as well as large scale packaging operations, such as milk bottlers or photo film producers.

Further objects and advantages of the present invention will become apparent from the following diagrams and descriptions, wherein:

FIG. 1 is a perspective view of a medicine bottle having a timer and storage condition indicator thereon, with the indicator showing the time to be expired;

FIG. 2 is an enlarged horizontal cross sectional view of the indicator and bottle shown in FIG. 1, the cross section having been taken on line 2—2 of FIG. 1;

FIG. 3 is an elevational view of a bottle and parts of the indicator, illustrating one method of applying the various layers of the indicator shown in FIGS. 1 and 2, the particular method shown being one in which the various layers are produced in rolls, and appropriate lengths cut from the rolls and assembled on the bottle;

FIG. 4 is a vertical cross sectional view of a modified form of the indicator shown in FIG. 1;

FIG. 5 is a cross sectional view, showing the completed assembly of the indicator shown in FIG. 4;

FIG. 6 is a vertical cross sectional view of a further modified form of a timer and storage condition indicator;

FIG. 7 is a vertical cross sectional view of a further modification of the modified form of indicator shown in FIG. 6;

FIG. 8 is a perspective view of another form of a timer and storage condition indicator;

FIG. 9 is a vertical cross sectional view of a form of preassembled timer and storage condition indicator; and FIG. 10 is a vertical cross sectional view of still another modified form of a storage condition indicator, showing the manner in which it is activated.

Referring more specifically to the drawings, and FIG. 1 in particular, one embodiment and use of the present invention is shown, wherein a medicine bottle 10, having a contents label 12, has a timer and storage condition indicator 14 attached to it. The work EXPIRED appears on the indicator, indicating that the shelf life of the medicine has been exceeded. The appearance of the word EXPIRED in a color, in contrast to the surrounding field of the indicator, occurred at the end of the integration cycle by means which will be explained more completely hereinafter. The indicator 14 which is applied to wall 16 of the bottle generally indicated by numeral 10, consists of a carrier layer 20 applied to the bottle as shown in FIG. 2, the carrier layer normally being composed of a porous or woven material such as cheesecloth saturated in the desired carrier mixture. The components of the carrier mixture are chosen to achieve the various timing periods, method of notification, and sensitivity to storage conditions which are desired.

A second transfer of absorptive layer 22, also consisting of porous material, is placed on the outer surface of carrier layer 20. This transfer layer may contain various components to react with the carrier layer components in performing the integration, timing and notification functions. The form of indicator shown in FIGS. 1 and 2 also has an outer layer 24 which completely covers both the carrier layer 20 and the transfer layer 22. This outer or cover layer effectively seals the two inner layers to the bottle. Outer layer 24 will normally consist of a thin plastic material, and may also have reactant components aiding in the integration and notification functions. One suitable composition for the carrier mixture consists of:

| Santicizer 141 | 10 grams | liquid carrier |
| Orasol black R.L. | 0.5 grams | black dye |

| | | |
|---|---|---|
| Vinyl Butyral XYSG | 1.0 grams | geling resin |

The carrier mixture of carrier layer 20 begins to migrate through the transfer layer 22 when the two layers are placed in contact with one another, the length of time required for the carrier mixture to migrate through the transfer layer performing the timing function. The time required for this process can be made to be dependent upon a number of physical factors. Addition of five grams of Santicizer 160 to the above carrier mixture provides a slower migration. Variation in the material of the transfer layer 22 will also vary the migration rate. Cheesecloth, either as a single layer or in multiple layers, paper and cardboard are suitable transfer layer materials which can be used to change the migration rate. Likewise, transfer layer 22 may be partially saturated with hard resins or other suitable blocking materials, thereby retarding the rate of migration of the carrier mixture.

The outermost or cover layer 24 will usually consist of a very thin plastic material. In the embodiment shown in FIG. 1, an opaque ink insoluble in the carrier mixture and contrasting in color to the dye of the carrier mixture is painted on the inner surface of cover layer 24. The painting is done so as to outline or stencil the desired word or form, in this particular example, the word EXPIRED. When the carrier mixture migrates through the transfer layer 22 and reaches the outer surface of the transfer layer, the dye of the carrier mixture shows through in the stenciled pattern. In this embodiment EXPIRED appears in the black dye of the carrier mixture.

In another variation, a soluble opaque ink is used on the interior side of cover layer 24. In this modification the transfer layer 22 may allow a rapid migration of the carrier mixture, relying instead on the time required for the liquid carrier to dissolve the ink to perform the timing function. This variation is especially useful for short timing periods. Addition of a saturated or partially saturated absorptive layer to this form can achieve longer timing periods.

In another variation, an opaque outer layer 24 is formed by drying the following on release paper:

| | |
|---|---|
| Vinyl Butyral Resin XYSG | 10 parts by weight |
| Titanium Dioxide Pigment | 10 parts by weight |

This dried formulation is placed over a thin carrier layer of the previously stated carrier mixture composition. An opaque rather insoluble ink is painted in strips on the outer surface of the dried cover layer formulation, the ink consisting of:

| | |
|---|---|
| Vinyl Acetate Resin B-7 | 10 parts by weight |
| Titanium Dioxide | 10 parts by weight in an alcohol solution |

In this construction the transfer layer 22 may again allow a rapid migration. The timing function is determined by the time required to dissolve the cover layer formulation. The soluble cover layer and the insoluble ink are substantially the same color so that, prior to dissolution of the soluble layer, the ink strips are not distinguishable. The carrier mixture dissolves the soluble cover layer but not the insoluble ink. With the carrier mixture and the insoluble ink being of contrasting colors, the ink strips become visible upon dissolution of soluble cover layer 24. This particular construction yields a timing period of approximately two days; however, a liquid polyamide resin added to the carrier mixture substantially increases the timing period.

Radiation sensitivity can be incorporated in the indicator by partially saturating transfer layer 22 or carrier layer 20 with a fluid which polymerizes to become either more or less viscous when exposed to the appropriate radiation. Solvent free printing inks are currently widely used which harden in seconds when exposed to intense ultraviolet light. Likewise, other such fluids which are sensitive to gamma radiation or electron radiation are also available. Thus, in any timer with any of these types of fluids, exposure to radiation would be indicated by a slower timing cycle than the predetermined length of cycle in the absence of radiation. Conversely, other fluids are available which, when exposed to radiation, depolymerize to become less viscous. Therefore, the response of the indicator would speed up in the presence of radiation. This latter type of timer is especially useful when made as a badge or tag to be worn by persons working in areas where they may possibly be exposed to radiation, such as X-ray technicians, nuclear medicine technicians, nuclear reactor workers and the like. The indicator which reacts more quickly in presence of radiation is especially useful to indicate that the maximum tolerance level of radiation for a given period has been reached.

In the use and operation of the timer shown in FIGS. 1 and 2, sufficient lengths of carrier layer 20 and transfer layer 22 are cut from each of their respective supply rolls 20' and 22' shown in FIG. 3. The carrier layer is placed directly on the bottle and the transfer layer is placed directly on top of the carrier layer. Cover layer 24 is slightly wider than the other layers and is cut slightly longer. It has an adhesive inner surface and will, when placed over the inner layers, effectively secure and seal the indicator to the surface of the bottle. As the carrier mixture and transfer layer come in contact, the carrier mixture begins to migrate through the absorptive layer. When the migration and any necessary chemical or physical reactions are completed, the desired notification will appear.

Modifications may be used in which the method of indication is other than the use of dyes and the appearance of words or symbols. One such modification includes an agent in the carrier mixture which creates a sticky surface upon dissolution of the cover layer 24 or upon surfacing an absorptive layer 22 when cover layer 24 is omitted. If the indicator is of sufficient size and location so that one using the container must touch the indicator, the sticky surface would immediately alert the user that the expiration time has been exceeded even when a word message might be overlooked. Yet another modification exists in which the carrier material contains agents which, at the completion of the integration cycle, release strong odor producing vapors to alert people to the expiration. These are but a few of the modifications which are possible in the timing and notification functions, and they may be combined to achieve the desired method of notification. Thus it is possible to have the appearance of a word such as EXPIRED and also have the surface of the indicator become sticky.

A number of modifications in the construction and shape of the indicator are possible, several of which are shown in FIGS. 4 through 10. In the modified form shown in FIG. 4 carrier layer 30 is produced alongside of transfer layer 32, as a single tape, in which outer layer 34 covers the upper surfaces of transfer layer 32 and carrier layer 30. between points 38 and 40, outer layer 34 has contact adhesive on both upper and lower surfaces. In the assembly of this particular indicator, carrier layer 30 is folded at point 36 underneath transfer layer 32. The adhesive end of outer layer 34 is then folded underneath carrier layer 30 as shown in FIG. 5 and effectively seals the indicator in its assembled form. The indicator may be affixed to a package by the remaining adhesive surface of outer layer 34 which at this point of assembly is the bottom surface of the indicator. Once assembled, the indicator's function is substantially identical to that previously described.

A further modified construction is shown in FIG. 6 in which an impervious base 40 has an absorptive transfer layer 42 on it. An impervious cover layer 44 seals the other layers and forms a capsule-like area 46 at one edge of the indicator in which the carrier mixture is stored. Absorptive layer 42 is isolated from capsule 46 by a seal 48 which prevents the carrier mixture from reaching absorptive layer 42. Cover layer 44 is opaque except for gaps indicated by areas 50, 52 and 54. To activate the indicator, capsule 46 is pressed, either by hand or by an appropriate dispensing machine, to rupture barrier 48. The carrier mixture flows to and begins migrating along absorptive layer 42. The progress of this migration can be observed through the gaps in the opaque cover layer, thus providing a warning as the expiration time approaches. Appropriate temperature sensitivity can be achieved by selecting fluids with different temperature-to-viscosity characteristics. Variations in the shape of absorptive layer 42 will change the rate of migration at different points in the timing range. Thus the indicator can be made to progress faster or slower at different points in the timing range.

In a further modification of this form, as shown in FIG. 7, a second seal 56 exists between capsule 46 and absorptive layer 42. Seal 56 is made with an adhesive which will slowly soften or dissolve when in contact with the carrier mixture. The absorptive layer 42 of this form is of a wick-like material which will quickly absorb the carrier mixture along substantially its entire length in a short period of time. In this particular construction, the timing function is performed mostly by the time required for the carrier mixture to dissolve seal 56. The indicator is activated identically to the previous indicator just described, wherein capsule 46 is depressed to rupture seal 48. If opaque layer 44 is of a color similar to that of absorptive layer 42 and has stenciled letters or words in it which are not opaque, and if the carrier mixture is of a contrasting color, the stenciled word or letters will suddenly appear when the carrier mixture is absorbed rapidly by absorptive layer 42. This particular construction is also useful as a preliminary delay or timer which can be used in conjunction with other indicators. Thus absorptive layer 42 can be used to rapidly transmit the carrier mixture to activate a second indicator where a slow migration rate through an additional absorptive layer may be used to perform a different timing and integration function.

A further modified form of indicator is shown in FIG. 8 wherein an impervious base 60 has an area with an absorptive layer 62 thereon. A capsule-like area 64 is disposed in one corner of the indicator and has a transfer capillary tube 66 leading from it and extending along one edge of the absorptive layer area 62. A rupturable seal exists between capsule 64 and capillary tube 66. When this seal is broken by depressing capsule 64 the carrier mixture flows along capillary tube 66. At this point it may begin a slow migration through absorptive layer 62 and perform integration and indication functions as described in the previous embodiments, or it may, in other applications, begin to dissolve a soluble seal which may be placed between the edge of capillary tube 66 and absorptive layer 62. In this last form, it then operates similarly to that embodiment described and shown in FIG. 7.

FIG. 9 illustrates a further modified form of an indicator which has an adhesive base layer 70 with an absorptive layer 72 thereon, and a cover layer 74 is disposed on the upper surface of absorptive layer 72. The carrier mixture is contained in a relatively small layer 76 at one side of the indicator. An impervious barrier layer 78 folded in a U-shaped configuration is disposed between the carrier mixture layer 76 and absorptive layer 72, with one end of barrier 78 extending outwardly from the edge of the indicator. This type of timer/indicator can be produced in long rolls completely assembled and can be cut off in an appropriate length when assembled on the package. To activate this type of timer, barrier 78 is grasped on its outwardly extending portion and is pulled outwardly. This will pull barrier 78 from between carrier layer 76 and absorptive layer 72, thereby allowing the carrier layer to contact the absorptive layer. This type of construction works especially well when the absorptive layer 72 is saturated and the fluid from the carrier layer 76 passes by means of diffusion through absorptive layer 72. As the carrier mixture diffuses along absorptive layer 72, it may indicate the changing conditions being monitored in different ways. For example, it can include a dye which changes the color of layer 72 or components of the saturant in the absorptive layer may react with the carrier mixture to produce color changes which would be visible through an opaque cover layer 74. One of the distinct advantages of this diffusion type timer is that very little fluid need be provided in the carrier mixture since the absorptive layer is already saturated. In one form of this diffusion timer, the carrier mixture consists of dried particles of dye which are dissolved by the saturant in absorptive layer 72 to then diffuse along the length of absorptive layer 72.

A still further modification is shown in FIG. 10 in which a porous base material 80 is disposed between an impervious layer 82 and an absorptive transfer layer 84 made of material such as tissue paper which is opaque when dry but becomes translucent when saturated. A cover layer 86 seals the entire indicator and forms a capsule-like area 88 along one edge. A rupturable seal 90 is disposed between capsule 88 and transfer layer 84. An appropriate dispensing machine having rollers 92 and 94 is used to dispense and activate the indicator. In dispensing the indicator, the rollers rupture barrier 90 and spread the carrier mixture from capsule 88 along transfer layer 84. If words or symbols are printed on the upper surface of porous base 80 when the carrier mixture is spread along the transfer layer 84, saturating it and thereby making it translucent, the words or symbols upon the surface of porous base 80 appear. The fluid of saturated layer 84 seals layer 84 onto porous base 80, thereby making the words or symbols readily visible.

As the fluid is transferred vertically downward into porous base 80 from transfer layer 84, the message or words disappear relatively abruptly, as opaqueness of absorptive layer 84 results not only from the loss of fluid from that layer which reduces its translucency, but also from the loss of the seal between absorptive layer 84 and porous base 80.

Several transfer or receptive layers may be placed in series in any particular construction of the indicator such that migration through one layer will trigger the beginning of a reaction in a second layer. In this way timing and calculation of expiration can be done in a situation where the various physical factors used in the integration must occur in a specific order before expiration results. Likewise, the reaction can be made to cease or slow when conditions are again proper, but resume again when the conditions are improper. For example, on a milk carton the indicator may be used to function rapidly under warm conditions, then to function more slowly under cooler conditions of proper storage, but to complete the entire timing cycle and indicate expiration of the shelf life at a time which would be earlier than it would have been had the milk been properly stored the entire time. Likewise, other reactions may be designed to calculate expiration based on physical factors over the entire storage period rather than the just immediate conditions.

It can be seen that the timer/indicator can be tailored to calculate any length of time under virtually any conditions desired. Any of the various activation mechanisms can be used with any timing and notification construction in a particular application. An additional advantage of the present invention is that identical carrier layers and cover layers may be used in conjunction with a number of absorptive or transfer layers. Thus, a user of the indicator can achieve various timing lengths by altering the form of the transfer layer without the need to change the carrier layer, carrier mixture or cover layer, or the means of indication of lapse of time. The indicator can easily be assembled when needed, either by hand or by machine, since the various tape constructions lend themselves readily to either form of application by conventional equipment used in the packaging industries. A means of notification may be selected so that the signal representing a preselected condition cannot be overlooked or ignored, or it can be subtle and sensed only by the immediate user. While in the embodiments shown, the indicators appear to be relatively large, they need not be, and sizes appropriate for attachment to small articles, such as a single pill, can be used successfully.

While several embodiments and modifications have been described herein, various other changes and modifications may be made without departing from the scope of the invention.

We claim:

1. A timer and storage conditions indicator adapted to indicate the passage of time integrated with various ambient physical environmental conditions, said indicator comprising a base layer of impervious material, a fluid carrier mixture containing a component the migration of which during operation of said indicator can be observed and indicates the passage of a predetermined length of time under predetermined ambient physical environmental conditions, said carrier mixture being in a stored condition in a relatively small area near one edge of said base layer until said indicator is activated, an absorptive layer on said base layer adapted to accept said carrier mixture within various elapsed time limits, a component in said indicator responsive to one or more of the ambient conditions, said component coacting with said fluid carrier mixture for causing the variation of said elapsed time limits by altering the rate of migration of said carrier mixture, a removable impervious barrier disposed between said carrier mixture and said absorptive layer, a cover layer disposed over and sealingly enclosing said absorptive layer and forming a capsule-like means for said carrier mixture near the one edge of said absorptive layer and means on said cover layer for indicating and for aiding in the indication of said migration rate within said elasped time limits.

2. A timer and storage conditions indicator as defined in claim 1 in which said removable barrier is a frangible wall portion of said capsule-like means, and said capsule-like means is flexible, permitting compression thereof to rupture said frangible wall portion.

3. A timer and storage conditions indicator as defined in claim 2 in which said cover layer is attached to said base layer between said capsule-like means and said absorptive layer by an adhesive soluble in said carrier mixture.

4. A timer and storage conditions indicator as defined in claim 1 in which said cover layer is attached to said base layer between said removable barrier and said absorptive layer by an adhesive soluble in said carrier mixture.

5. A timer and storage conditions indicator as defined in claim 1 in which said carrier mixture and said transfer layer are in vertical proximity, said removable barrier includes an impervious sheet folded to form first and second layers between said carrier mixture and said transfer layer, and one end of said impervious sheet extends outwardly from the edge of said indicator.

6. A timer and storage conditions indicator as defined in claim 1 in which a capillary tube is disposed between said capsule-like means and said absorptive layer.

7. A timer and storage conditions indicator as defined in claim 1 in which said absorptive layer is saturated with a fluid and said carrier mixture passes therethrough by means of diffusion.

8. A timer and storage conditions indicator as defined in claim 1 in which said capsule-like means is separated from said absorptive layer by a frangible wall and said frangible wall is rupturable by force exerted on said capsule-like means when the indicator is activated.

9. A timer and storage conditions indicator as defined in claim 1 in which a transfer means is disposed between said capsule-like means and said absorptive layer.

10. A timer and storage conditions indicator as defined in claim 1 in which a transfer layer of absorptive material having the characteristics of being opaque when dry and translucent when saturated is disposed on said absorptive layer, and said transfer layer is saturated by said carrier mixture to reveal symbols on said absorptive layer when the indicator is activated.

11. A timer and storage conditions indicator as defined in claim 1 in which said cover layer is opaque and extends over said absorptive layer, gaps are disposed in said opaque cover layer through which spaced regions of said absorptive layer can be observed, and said carrier mixture is contrasting in color to said absorptive layer.

12. A timer comprising a base layer of impervious material, an absorptive layer disposed on said base layer, a cover layer enclosing said layers and forming a capsule disposed at one end of said base layer adjacent said absorptive layer, a frangible wall portion of said capsule adapted to rupture when said timer is activated by external pressure exerted on said capsule, a carrier mixture contained in said capsule and transmittable in a migratory fashion through said frangible wall to said absorptive layer after said frangible wall is ruptured, said carrier mixture and at least one component in said absorptive layer coacting to migrate through said absorptive layer over a predetermined period of time, and means in the cover layer for detecting the presence of said carrier mixture in said absorptive layer and for aiding in the correlation of the detection thereof to the passage of said predetermined period of time.

13. A timer as defined in claim 12 in which a portion of said cover layer is attached to said base layer between said frangible wall and said absorptive layer by an adhesive soluble in said carrier mixture.

14. A timer as defined in claim 12 in which a capillary tube is disposed between said capsule and said absorptive layer.

15. A timer as defined in claim 12 in which a transfer layer is disposed on said absorptive layer, said transfer layer having the characteristics of being opaque when dry and translucent when saturated, and a means is provided for saturating said transfer layer with said carrier mixture when the timer is activated to reveal symbols on said absorptive layer.

* * * * *